May 5, 1970     E. LEVIN     3,509,933
APPARATUS FOR RENDERING BIOLOGICAL TISSUES BY HEAT TRANSFER
Filed May 23, 1967     3 Sheets-Sheet 1
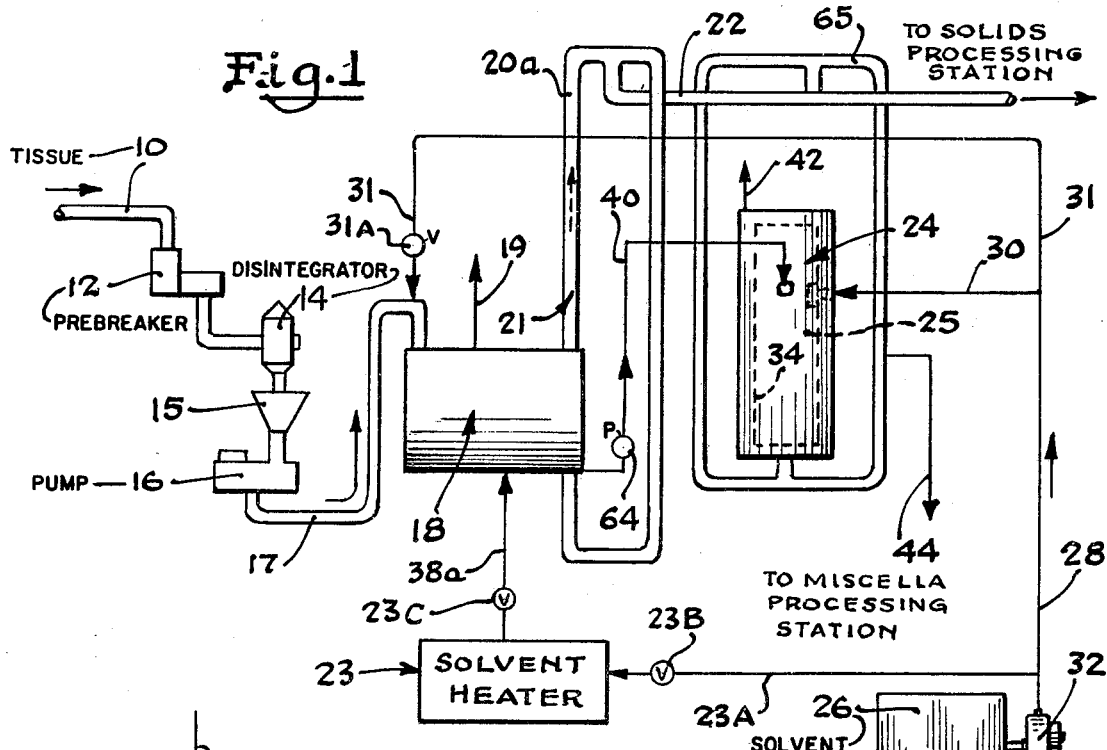
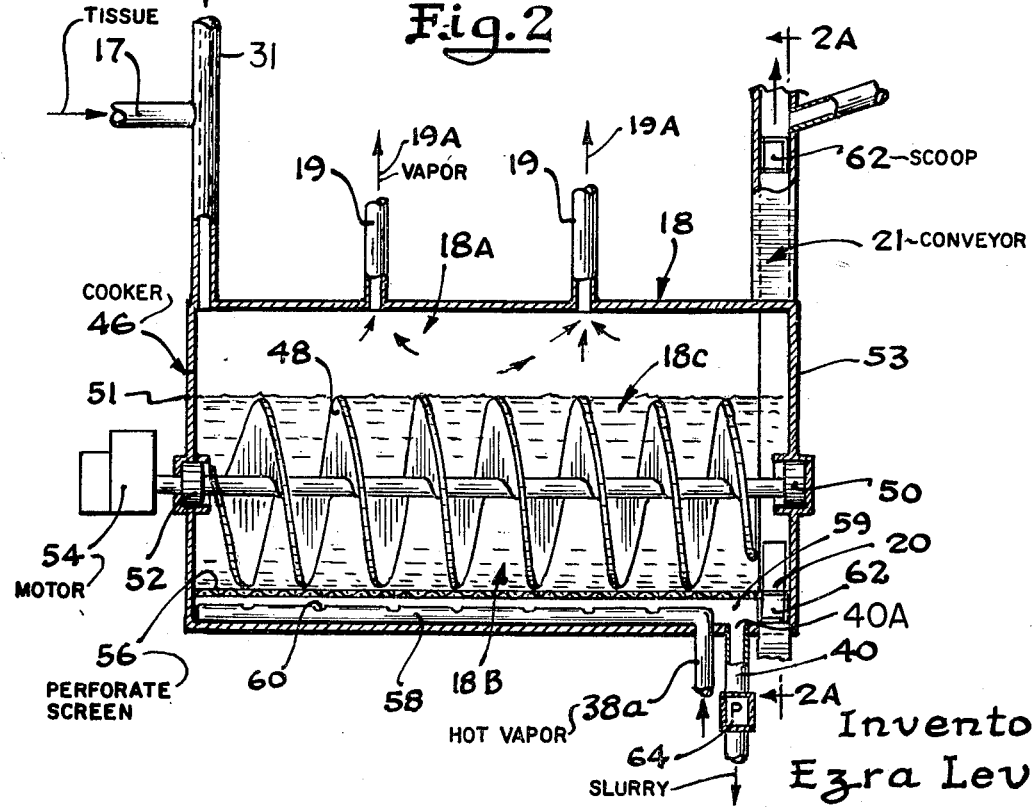
Inventor
Ezra Levin
By Burmeister & Kulie
Attorneys

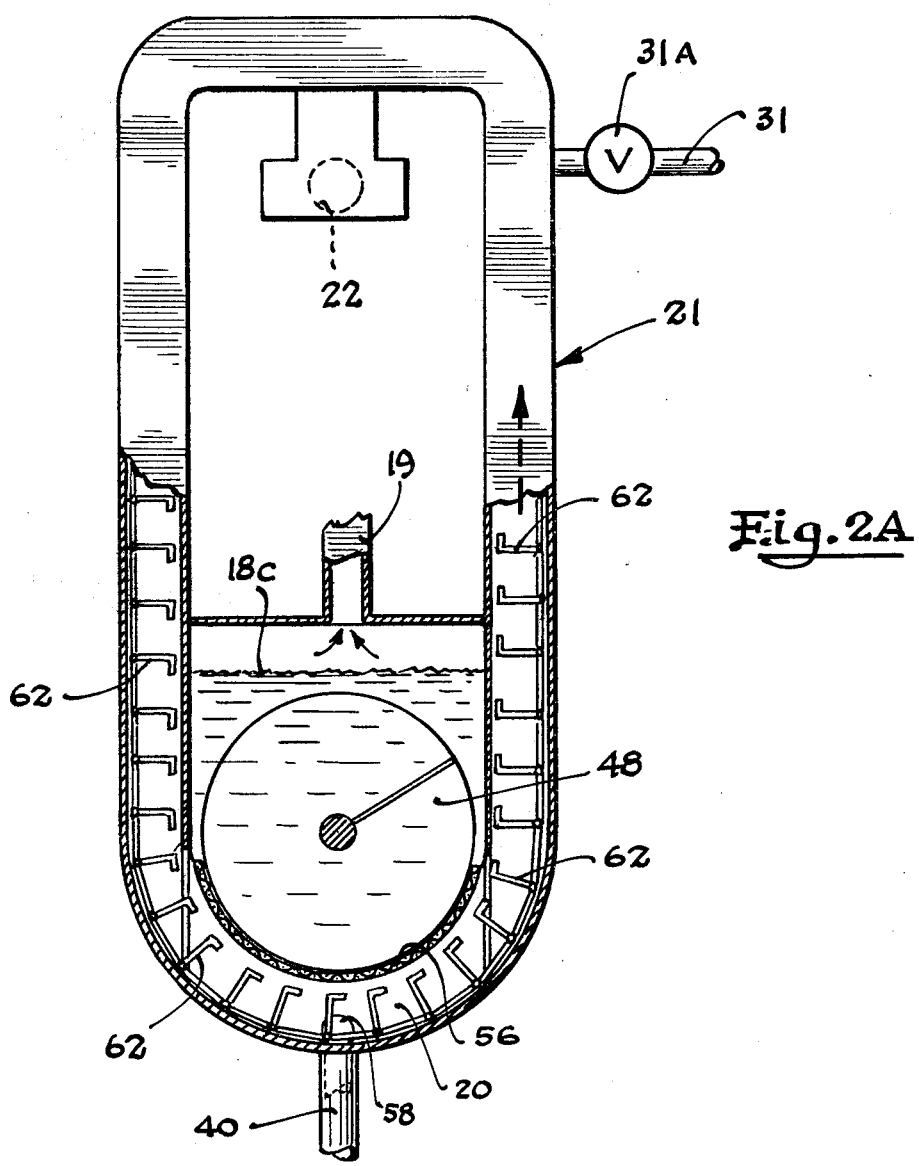

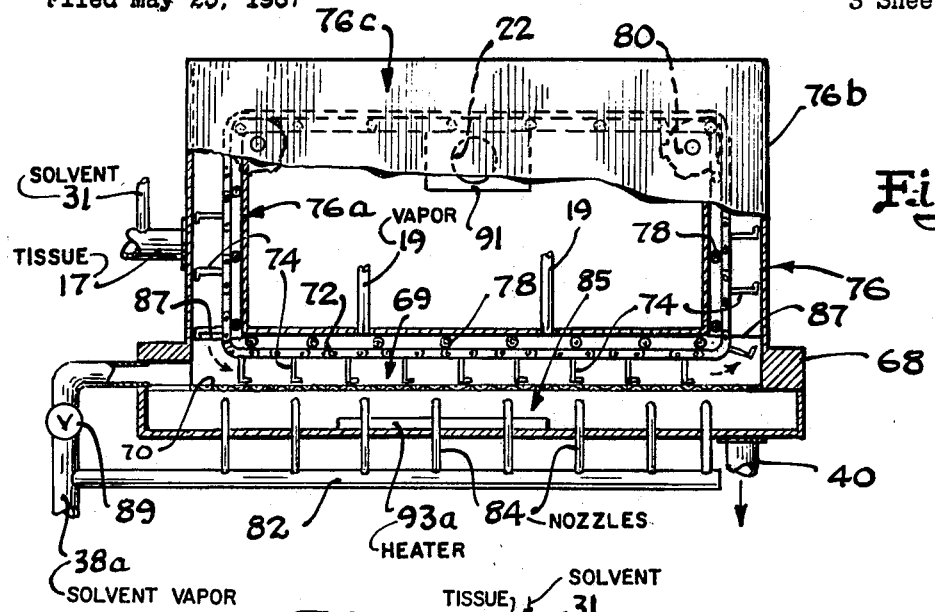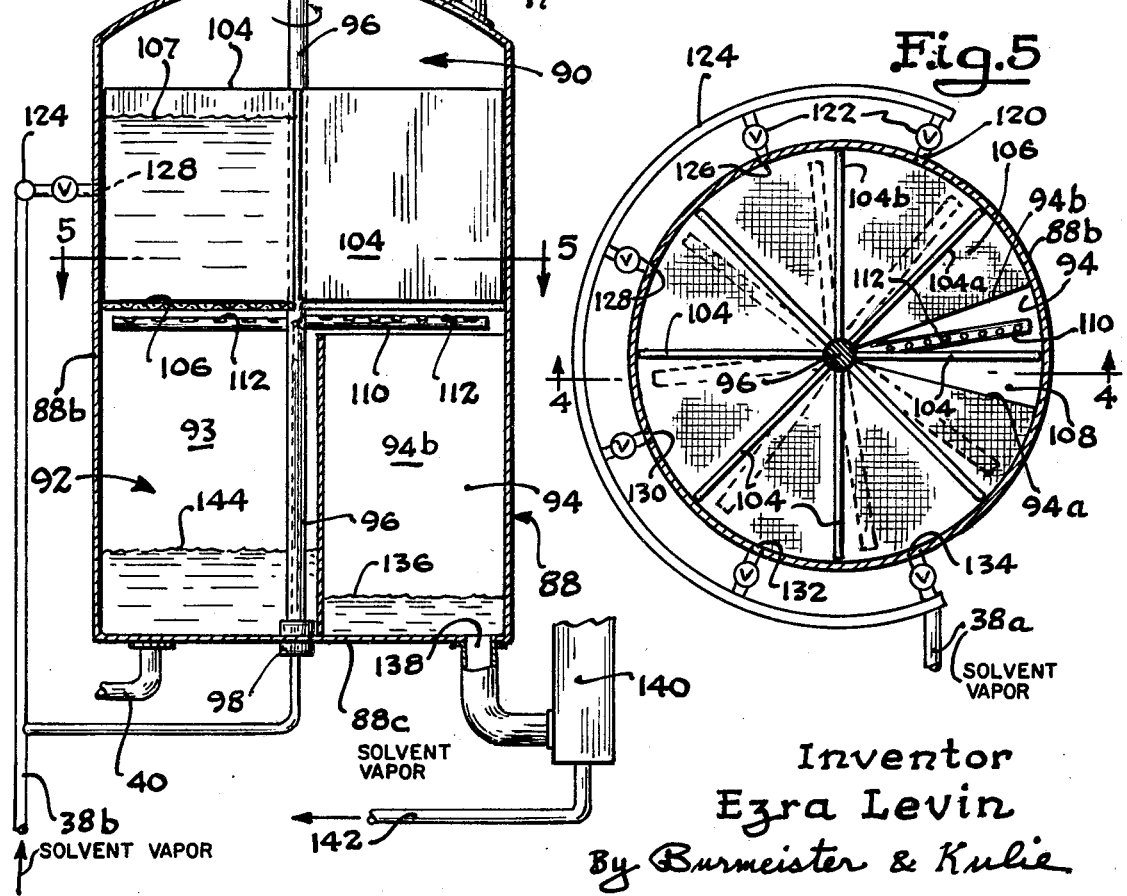

United States Patent Office 3,509,933
Patented May 5, 1970

3,509,933
APPARATUS FOR RENDERING BIOLOGICAL TISSUES BY HEAT TRANSFER
Ezra Levin, Champaign, Ill., assignor to VioBin Industries, Inc., Champaign, Ill., a corporation of Delaware
Continuation-in-part of application Ser. No. 408,231, Nov. 2, 1964. This application May 23, 1967, Ser. No. 640,523
Int. Cl. B01d 1/14
U.S. Cl. 159—16                    6 Claims

ABSTRACT OF THE DISCLOSURE

Three separate apparatuses are disclosed herein for practicing methods of defatting and dehydrating wet animal tissue by heating the animal tissue in a fat solvent that forms with water an azeotrope having a boiling point lower than that of the solvent. Adherence of the particles to the apparatus is substantially reduced by heating of the slurry of fat, water, particles, solvent, and azeotrope by solvent vapor. The particles may be heavier than the solvent and are moved during heating along a path by mechanical means illustrated as a screw, drag or vaned rotor. Adherence of sticky wet particles to the structure defining the bottom of the path is substantially eliminated by defining the path bottom by a screen subjected to jets of solvent vapor and exposed to the mechanical means for moving the particles along the path. The particles are partially dehydrated in a first vessel of the type described above, called a primary cooker, and may be more fully dehydrated in a secondary cooker. In apparatus incorporating a vaned rotor substantially complete dehydration may be achieved in the first vessel.

---

This application is a continuation-in-part of the inventor's copending patent application entitled Continuous Rendering Process and Apparatus, Ser. No. 408,231, filed Nov. 2, 1964.

This invention relates to a method and apparatus for removing fat and water from biological tissues by a fat solvent which forms with water an azeotrope having a boiling point lower than that of the solvent.

It is often required to remove both water and fat from biological tissue. Reference may be made to the present inventor's issued patent U.S. 2,619,425, and to his copending application, Ser. No. 408,231, filed Nov. 2, 1964. The foregoing shows the use of azeotropic distillation to remove both water and solvent, as a vapor, at a temperature which is lower than the boiling point of the water alone or the solvent alone. Water and many solvents, such as ethylene dichloride or heptane are said to form a mixture of constant boiling point, called an azeotrope.

The foregoing copending application shows how a slurry of particles, solvent and extracted fat, is separated to product defatted and dehydrated particles, fat and solvent. That copending application teaches removing a portion of the slurry from a primary cooker and passing it through a filtering zone where a portion of the particles are removed. Hot vapor solvent is conveyed to the filtering zone from a secondary cooker to keep the filter screen operational. The secondary cooker is employed to treat the portion of the slurry removed from the primary cooker to substantially complete the distillation.

Cookers for solvent extraction, such as the primary and secondary cooker used in the foregoing copending application, have heating means to raise the temperature of the slurry therein to its boiling point. The heat source is conventionally steam which is delivered to heating panels or plates associated with the cooker. This heat source is separate and independent from any heat source which may be required to heat the solvent as must be done to add hot solvent or to employ solvent vapors to maintain a filter operational as described above. A separate heating means for solvent and all the necessary ancillary equipment usually required to operate said separate heating means increases the complexity and the expense of operating the system.

A cooker which is used to simultaneously extract fat from tissue and to form an azeotrope with the water in such tissue generally has heating panels against the walls of the cooker or inside the cooker to impart the necessary heat to the contents thereof. A problem arises from such a use because insoluble and soluble components of the particles cake or conglutinate on such heated panels, particularly when defatting and dehydrating fish or meat, which reduces the heat transfer and the efficiency of transferring miscella and solids from the cooker for further processing. The loss of heat transfer and discharge of materials from the cooker becomes, in fact, sufficiently impeded so as to require periodic shutdown and cleaning of the encrusted plates, panels or other heating surfaces. This likewise adds to the complexity and expense of operating the system.

It is accordingly one primary object of this invention to provide an apparatus and method wherein heat is provided for azeotropic distillation without requiring heating plates, panels or surfaces which are objectionable sites for deposition of moist particles.

A still further object of the invention is to provide an apparatus and method wherein fat and water may be removed from biological tissue in a cooking vessel in which no space or volume is lost to a heating source or to a heat transfer means.

It is another object of this invention to provide a method wherein biological issue may be defatted and dried by azeotropic distillation which is more economically conducted by using heat transfer from solvent vapors in the same vessel where said azeotropic distillation is undergoing formation.

It is provided that the source of heat for forming the azeotrope in the tissue and solvent mixture is supplied by hot solvent vapors which are introduced directly into the tissue and solvent mixture. The vapor temperature of the solvent used is substantially higher than the temperature at which the azeotrope is formed. Such a difference or divergence is sufficient to induce boiling of the azeotrope at its lower boiling point from that of the solvent.

The hot solvent vapors are evolved in a zone separate from the zone or container in which the tissue-solvent mixture is introduced, and such solvent vapors are formed by application of heat from conventional sources and means, such as heating plates. The hot solvent vapors are evolved preferably under pressure so that the vapor temperature is elevated to levels sufficient to lead to efficient heat exchange when introduced to the tissue-solvent mixture. Such high temperature solvent vapor is conveyed to the azeotrope forming zone by communicating means which may be heated by heat jackets or be well insulated so that the vapor temperature is maintained at the desirable levels. The hot solvent vapors are continuously introduced to provide sufficient heat to maintain the azeotrope under rapid boiling conditions.

The azeotropic distillation is conventionally performed in a substantially closed vessel where comminuted tissue is combined with a solvent capable of forming an azeotrope with the water present in the tissue particles. Such solvents are well known in this art and include both the polar and non-polar solvents. Polar solvents may be preferred for some extraction methods, and such solvents may be represented by ethylene dichloride, propylene dichloride, perchlorethylene and other halogenated aliphatics.

The non-polar solvents include pentane, hexane, benzene, toluene, cyclohexane and the like. Heptane is particularly desirable because it is economical and effective. The slurry of solvent, comminuted tissue, fat and water is maintained under rapid boiling conditions, and the azeotrope vapors produced are withdrawn.

The present invention also includes the use of a filter in some of its forms, and the use of the hot solvent vapor to maintain said filter operable. The process and apparatus which will be more fully disclosed are well adapted to direct the hot vapor solvents to the filter to remove the deposits of insoluble conglomerates which have been baked onto the screen. Such adhering deposits have been and will be variously referred to herein as cakes, conglomerates, conglutinates, and glazes; such terms being interchangeable.

In various embodiments, the wet tissue is advanced along a perforate support while the water is being removed by azeotropic distillation. The hot vapor solvent is also used to advantage for sparging, that is, to clean the perforate support of undue conglutination of tissue which unduly obstructs movement of the tissue. The support is required to be perforate so that the vapors can clean the support.

In a preferred practice of the present invention, a non-polar solvent is used which has market advantages of economy and effectiveness, namely, heptane. This organic solvent effectively defats the tissue, it forms the azeotrope, and the divergent temperatures between the azeotrope and hot vapor solvent, under pressure, can be sufficiently great to effect efficient heat transfer to form the azeotrope. Heptane is substantially lighter than substantially all of the biological tissues normally subjected to the defatting and drying operation, therefore, such tissues sink in the body of solvent. The apparatus of the present invention is designed to use to advantage this relative property between the tissue and the solvent as will be described in greater detail. The settling of the tissue to form the lower stratum of the zone, for example, leads to advantages of positioning mechanical means or members adjacent to the bottom support for transferring or otherwise handling the tissue.

In certain embodiments, when using heptane, the tissue particles in the azeotropic zone may be conveniently moved by mechanical means along a support in the lower portion of the vessel or other container which makes up the azeotropic zone.

The hot vapor solvent is preferably formed under pressure so that the thermal capacity of the vapor is greater and thereby results in greater heat transfer to the slurry. This understandably results in wider divergent temperatures between the solvent vapor and the azeotropic boiling point. The greater this temperature difference or divergence between the respective boiling points, the more efficient is the heat transfer. It is to be understood that the smaller the divergent range, then the greater is the required quantity of solvent vapor and need for superheating the vapor.

Various hot vapor solvents may be used for the heat transfer in the azeotropic zone excluding, of course, water vapor which would complicate the efforts to remove the water from the tissue. Non-aqueous fat solvents such as the organic solvents previously mentioned find acceptable use, and the solvent heptane, is particularly desirable.

The following drawings are presented as a further disclosure of the apparatus which can be used to practice the methods of the invention, such drawings including views wherein:

FIG. 1 is a diagrammatic view of an apparatus assembly for separating fat and water from particles of biological tissue, such as fish or meat;

FIG. 2 is a somewhat diagrammatic view of the primary cooker illustrated in FIG. 1;

FIG. 2A is a sectional view taken along the line 2A—2A of FIG. 2;

FIG. 3 is a side elevational view of an alternative embodiment, partly broken away and in section, which can be used in the apparatus assembly shown in FIG. 1, or with other assemblies;

FIG. 4 is a vertical sectional view of an alternative embodiment which can be used in association with the assembly shown in FIG. 1, or with other assemblies; and FIG. 5 is a sectional view along line 5—5 of FIG. 4.

The use of the same numerals in the various views indicates a reference to the same parts and structures.

As illustrated in FIGS. 1 and 2, particles of biological tissue, such as fish, meat, coconut or the like, are delivered through a conduit 10 to a prebreaker 12, then to a disintegrator 14, and to a hopper 15. The comminuted tissue in the hopper is of a desirably small particle size which can then be conveyed by a pump 16 to other portions of the apparatus. Such tissue particles are moist because of tissue water, and are introduced by way of tissue inlet 17 into a first vessel or cooker 18 which forms a first processing or azeotroping zone shown generally as 18A. The wet tissue particles are continuously introduced into the azeotroping zone 18A where dehydration and defatting of the tissue in a body 18B of fat solvent commences. The tissue particles may be precoagulated by treatment with a portion of the hot solvent present in the cooker 18 according to the method shown in U.S. Pat. No. 2,503,312, issued to the present inventor and Everett M. Worsham. The tissue particles may also be sprayed into the hot boiling solvent at a point adjacent to the top level of the body of the boiling solvent as shown by the present inventor in his U.S. Pat. No. 2,996,386. In any event, some controlled introduction of the tissue particles into the body 18B of fat solvent within cooker 18 is preferred to avoid agglomeration of the tissue. The solvent in the body 18B in the cooker 18 must be one which forms an azeotrope with water and is water immiscible; and the body 18B only partially fills the cooker, as shown by the level line 18C.

The mixture of tissue and solvent in the cooker 18 forms a slurry of wet particles, fat and an azeotrope of water and the solvent, and is heated sufficiently to maintain rapid boiling of the slurry, and vapor from the solvent-water azeotrope is vented through the vent 19 as indicated by the arrow 19A. As will presently appear, the vent 19 constitutes azeotrope vapor receiving means which withdraws azeotrope vapors from the cooker 18 through an outlet in the top of the cooker formed as shown by the vent 19.

The wet solid particles are removed from the azeotroping zone 18 by entering an arcuate tissue outlet 20 which communicates with a run-around conveyor 21. The solid particles with a portion of the tissue water removed, are then deposited in conduit 22 and directed to a solids processing station such as described in applicant's copending patent application Ser. No. 408,231.

Heat is introduced into the cooker 18 to maintain the slurry under rapid boiling conditions, and such heat is obtained according to the present invention from hot vapor of the same solvent as the body 18B formed in a solvent heater 23. The non-aqueous fat solvent is introduced from a reservoir of work tank 26 into the heater 23 by delivery along line 23A, and through a pump 32. A level control valve 23B is used to control the delivery of the solvent into heater vessel 23 from line 23A. The solvent is also delivered to the cooker 18 along a line 28 and a branch line 31 through a level control valve 31A. A secondary cooker 24 also contains a body of slurry 25 and is heated by means such as the interior heating plates indicated at 34. The heater 23 is provided with a pressure control valve 23C at its outlet so that the solvent therein is heated under pressure. As a result, the temperature of vaporization is elevated above that required by the boiling point of the solvent at atmospheric pressure. When heptane is used, its boiling point of 98.4° C. will be accordingly increased. The superheated solvent vapor from the solvent heater 23 is introduced into the primary cooker 18 to maintain the temperature of the slurry vessel 18 at the boiling point of the azeotrope.

The illustrated apparatus of FIG. 1 shows a line 40 for delivering a portion of the slurry from the primary cooker 18 to the secondary cooker 24. The slurry traveling through this line has a smaller ratio of solids to liquids than exists in the primary cooker because a portion of the solids are removed by the conveyor 21, but the slurry still contains wet particles which are dried in the secondary cooker 24 by azeotropic distillation, the solvent-water azeotrope vapors leaving the secondary cooker 24 as indicated by the arrow 42. The secondary cooker is maintained approximately at the boiling point of the solvent, and a miscella which is substantially free of moisture is conducted out of the secondary cooker to a miscella processing station, as indicated by the arrow 44, where the miscella may be filtered as disclosed in the inventor's copending patent application, Ser. No. 408,231.

The primary cooker 18 may take various forms, one of which is indicated in FIG. 2. The cooker 18 comprises a housing or vessel 46 containing a screw conveyor 48, the shaft whereof is journalled at opposite ends at 50 and 52 in the end walls 51 and 53 of the housing. A motor 54 turns the screw conveyor, and the screw is adapted to move the tissue particles which are supported on a perforate screen or support 56 in the form of a part cylindrical segment having a radius approximately equal to the radius of the screw 48. The screen is elongated arcuately shaped in the transverse direction to conform to the contour of the path of the helical screw flights. Thus, the conveyor screw 48 turning in overlying relation to the perforate screen or support 56 functions as mechanical transfer means to move tissue and tissue solids over the perforate support from the inlet 17 to the outlet 20. This type of cooker is particularly preferred when using heptane solvent which is lighter than the tissue particles usually employed. The hot solvent vapor is introduced into the cooker by vapor distributing means comprising the line 38a which leads from the solvent heater 23 to a manifold tube or plenum 58 disposed in a space 59 which extends substantially along the entire length of the screen 56. The plenum has a plurality of holes 60 to emit hot vapor solvent into the interior of the housing 46 to maintain the temperature of the slurry at the boiling point of the azeotrope.

In addition to effecting a heat transfer, the hot vapor solvent also serves to keep screen 56 relatively free of caked tissue. Because of the hot environment, the tissue particles tend to glaze the screen or to otherwise conglomerate and obstruct transfer of the tissue along the length of the screen 56.

The tissue particles are continuously moved towards the end 53 of the housing where the conveyor 21 is located. At end 53 of the housing, the tissue particles fall into the run around conveyor 21 through the arcuate opening 20 and are scooped up in shoes 62.

A portion of the slurry moves out of the housing 46 and into line 40 after being filtered through screen 56. Thus, the line 40 forms miscella receiving means connected to the housing or vessel 46 at a miscella outlet 40A from the vessel disposed below the perforate support or screw 56 as shown in FIG. 2. The screen 56 is maintained open by the jets of vapor from the manifold 58, and only the finer particles pass through the perforations of the screen into the manifold. As a result, the slurry transmitted by the line 40 to the secondary cooker 24 contains fewer particles than the slurry 18B, but the particles are only partially dehydrated. The line 40 contains a pump 64 which transfers a metered quantity of slurry from the primary cooker 18 to the secondary cooker 24 in order to maintain the level of the slurry in the secondary cooker 24.

The portion of the slurry transferred from the primary cooker 18 to the secondary cooker 24 is further defatted and dehydrated in the secondary cooker by azeotropic distillation. Ordinary heating panels 34 are employed in the secondary cooker, and may be employed without the danger of glazing or caking which is present in the primary cooker 18 because the moisture content of the secondary cooker is substantially reduced and the ratio of solids to liquids is much lower in the secondary cooker.

The solid particles in the secondary cooker fall due to the higher specific gravity of these particles than the miscella, and a proportion of the solids of the secondary cooker 24 are removed by a run-around conveyor 65 in communication with the bottom of the secondary cooker 24. The run-around conveyor 65 discharges the solid particles carried thereby into the conduit 22 which conveys these particles with the particles of the primary cooker to the solids processing station.

The miscella from the secondary cooker is removed from the upstream side of the run-around conveyor 65 in order to minimize the solids to liquids ratio in the miscella. The miscella may also be removed directly from the secondary cooker, if desired. The solid particles in the miscella are fully dried and may be removed by a filter, as described in the inventor's patent application Ser. No. 408,231.

Another form of the azeotropic forming zone is indicated in FIGURE 3. In this embodiment, a vessel in the form of an elongated housing 68 contains an elongated substantially flat screen 70 at the bottom thereof. A mechanical drag 69 moves the tissue particles along the screen.

The mechanical drag 69 is shown as an endless chain 72 having a plurality of interconnected links or shoes 74. The chain is translatable in a run-around housing 76 which has two vertical legs 76a and 76b communicating with opposite ends of the elongated housing 68 and horizontal legs 76c and 76d. A plurality of fixed rollers 78 are mounted adjacent to the inner side of the legs 76a, 76b and 76c to rotatably engage the chain 72. The chain may be turned by means such as a motor driven sprocket wheel 80. The sprocket wheel 80 is mounted below the upper leg of the run-around conveyor and directly engages the chain 72.

In this embodiment, the hot vapor for forming the azeotrope is conveyed from line 38a to manifold or plenum 82 disposed below the housing 68. The manifold 82 is shown with a plurality of communicating and upright conduits 84 which enter a space 85 located below the screen 70 in the housing 68 and direct hot vapor solvent against screen 70. Particles enter the housing 68 at the intake end from leg 76a and through the tissue inlet 17. The particles may or may not be mixed with relatively cool solvent from the line 31 in order to aid in avoiding conglomeration of the particles. Hot solvent under pressure is also introduced into the housing 68 at the inlet end from the conduit 38a in sufficient quantity to maintain the particles in a flooded condition, namely to maintain a level substantially filling the housing 68, as is indicated at 87 in FIG. 3. A level control valve 89 located in the conduit 38a at the inlet end of the housing 68 accomplishes this function.

A substantial portion of the particles are translated on the upper side of the screen through the housing 68 by the drag 69, and these particles are elevated on the shoes 74 in the leg 76b and translated across the leg 76c to the outlet receptacle 91 which is connected to the conduit 22 which communicates with the solid processing station. The hot vapor solvent from the conduits 84 also removes the conglutinated tissue particles so that the accumulation and glaze does not obstruct movement towards the tissue outlet receptacle 91.

The jets of superheated vapor from the conduits 84 perform four separate functions. First these jets are the primary source of solvent to maintain the level 87 in the housing, and a volume of slurry must be removed from the housing at least equal to the equivalent liquid volume of the vapor from the conduits 84 at all times. Vapor from the line 38a merely makes up any deficiency of solvent in the housing and forms a convenient mechanism for maintaining the level 87.

Second, the jets of vapor from the conduits 84 prevent adherence of masses of sticky wet particles on the upper surface of the screen 68. The vapor from the conduits 84 is dry, and it is believed to rapidly dry any wet particle which might adhere to the screen in the immediate vicinity of the jet in a manner similar to flash drying. As a result, the particle looses its stickiness and is readily dislodged by the shoes of the drag 69. In addition, the vapor pressure forces open the perforations of the screen confronting the jet, thereby aiding dislodgment of particles. The dislodged particles thereupon assume the moisture content of their environment.

Third, the superheated vapor forms a source of heat to maintain the slurry under rapid boiling conditions. Since the vapor releases its heat directly in the slurry, there is essentially no hot surface on which the sticky wet particles can adhere and be baked on. In most cases sufficient heat can be obtained from vapor alone, or in conjunction with superheated solvent introduced through conduit 38a, but conventional heating panels may also be used if desired, as indicated at 93a.

Fourth, the jects of vapor keep areas of the screen open to permit a slurry of fat, solvent and finer partially dried and defatted particles to flow therethrough to the conduit 40 which carries this slurry to the secondary cooker 24.

The embodiment of FIGS. 4 and 5 may be used to defat and dehydrate particles sufficiently to permit the particles to be directly transmitted to a solids processing station, or may be used as the primary cooker 18 in the assembly illustrated in FIG. 1 depending upon the material being processed and the manner of operation, as will be hereinafter more fully described. In the embodiment of FIGS. 4 and 5, a housing 88 of a generally cylindrical configuration is employed, and the tissue particles are introduced into housing through the inlet conduit 17 which has an opening in the housing cover 88a adjacent to the cylindrical sidewall 88b of the housing 88. The housing 88 has an upper chamber 90 which operates as the azeotrope forming zone and which is adapted to receive comminuted tissue. The housing also has a lower chamber 92 which is divided between a major portion 93 and a minor portion 94 by a pair of walls 94a and 94b. The walls 94a and 94b are sealed to the cylindrical shell 88b of the housing 88 and a flat base 88c, and the walls 94a and 94b converge toward the axis of the cylindrical shell 88b and are sealed together adjacent to the axis of the housing.

The upper portion 90 and lower portion 92 are separated from each other by a screen 106 which extends across the cylindrical shell 88b and is sealed at its periphery thereto. A rotatable shaft 96 is disposed on the axis of the cylindrical shell 88b and journaled in bearings 98 and 100 at the bottom end and top of the housing, respectively. A motor 102 is shown for rotating the shaft at a selected rotation rate. A plurality of vanes 104 are mounted on the shaft 96 in the upper chamber 90, and the vanes 104 are disposed at an acute angle to each other. Further, the vanes 104 are disposed in slidable abutment with the screen 106 and with the inner surface of the cylindrical shell 88b. The screen 106 has a plurality of openings distributed throughout the screen which are sufficiently small to permit flooding of the upper portion of the housing 88 to a level designated as 107 for purposes that will be described hereinafter. The screen also has a pie-shaped opening 108 to the upstream side of the inlet 17, and the region of the upper portion 90 of the housing 88 directly above the pie-shaped opening 108 is drained of slurry. It has been found that the screen may have a mesh of approximately 20 and maintain flooding in the upper portion 90 of the housing 88.

The tissue particles, which may include comminuted fish, meat, or other tissue, are introduced into the region of the upper portion 90 of the housing 88 through the inlet 17 and immediately below the inlet 17. The vanes 104 separate this region from other regions, and for illustrative purposes, the region confronting the inlet 17 has been shown bordered by vanes designated 104a and 104b, see FIG. 5. It is necessary that this region be flooded with boiling solvent on introduction of the comminuted tissue, and in order to accomplish an adequate level of solvent, an opening 120 in the cylindrical shell 88b is provided in this region, and the opening 120 is connected through a flow control valve 122 and a manifold 124 to the solvent conduit 38b which is connected to the source of superheated solvent, namely the solvent heater 23. Further, relatively cool solvent from the branch 31 is mixed with particles prior to introduction into the housing 88 so that an adequate supply of solvent is obtained in the region between the vanes 104a and 104b.

As illustrated, the vanes will rotate in a counter-clockwise direction, and the vanes maintain adequate sealing to the screen 106 and the inner surface of the shell 88b to maintain a flooded condition. On introduction of the particles into the zone between the vanes 104a and 104b, an azeotrope is formed with the solvent, and the vapors from the azeotrope are removed from the housing 88 through the vapor outlets 19 located in the dome 88a of the housing.

The rotor shaft 96 is hollow, and is connected through a rotatable coupler to the conduit 38b containing superheated solvent. A plurality of vapor distributors or plenums 110 extend radially from the rotatable shaft 96 immediately adjacent to the lower side of the screen 106, and these distributors 110 contain a plurality of openings or perforations 112 on their upper surfaces confronting the screen 106. Each of the distributors 110 precedes one of the vanes and has the function of emitting superheated vapor through the screen 106 to remove conglomerated particles from the screen and permit the following vane to readily scrape across the screen 106. The superheated vapor from the distributors not only aids in rotation of the vanes against the screen, but also permits a small amount of miscella which contains small tissue particles to pass from the upper compartment 90 to the lower compartment 92 of the housing. In addition, the vapor from the distributors 106 heat the slurry in the upper compartment 90 of the housing 88, and help maintain rapid boiling conditions.

As the vanes 104a and 104b are rotated about the shaft 96, the vane 104a passes the opening 120 to cut off a supply of superheated vapor through the valve 122. Hence, a plurality of additional openings 126, 128, 130, 132 and 134 are disposed in the cylindrical shell 88 communicating with the upper compartments 90 below the level 107 of the slurry, and the compartment formed by the vanes 104a and 104b and the inner surface of the cylindrical shell 88b consecutively communicates with these openings. Each of the openings is connected to the manifold or plenum 124 through a flow control valve 122. The flow control valves 122 are adjusted to maintain the level of the slurry in the compartments and to maintain the slurry in the associated compartment under rapid boiling conditions.

As the compartment formed by the vanes 104a and 104b traverses about its path, the moisture content of the slurry declines. If the moisture content in the slurry declines sufficiently to permit the slurry to assume the boiling point of the solvent, rather than the azeotrope, rapid boiling conditions in the compartment will cease due to the fact that the higher temperature of the boiling point of the azeotrope must be maintained and the heat source formed by vapors of that solvent is inadequate for that purpose. When the compartment comes into alignment with pie-shaped opening 108, the contents of the compartment are dumped into the minor portion 94 of the lower compartment 92.

As indicated in FIG. 4, a level of slurry 136 which consists primarily of fat, solvent, and solid particles, appears in this minor portion of the lower compartment and is drawn from the compartment through the opening 138 to a run-around conveyor 140 which elevates the solid particles and permits their removal to a solid particles processing station. The run-around conveyor also is connected to a conduit 142 which may be directly processed, that is, the solid particles removed therefrom by filtering and the fat and solvent separated.

If the azeotroping process is not carried on sufficiently to reduce the moisture content of the slurry to permit the slurry to boil at the boiling point of the solvent, then it is necessary to further process the liquid portion removed from the run-around conveyor 140 through the conduit 142. Further processing can be achieved by connecting the conduit 142 with the conduit 40 and introducing this slurry into the secondary cooker 24.

A portion of the slurry of all compartments in the upper compartment of the housing 88 passes through the screen and is collected in the major part of the lower compartment 92. This slurry contains moisture as well as fat, solvent and solid particles, and is preferably processed by introducing it into the secondary cooker 24 through the conduit 40. It is to be noted that there is a relatively low level of slurry in this major part of the lower compartment also, the level being indicated at 144.

An example of practicing the method and using the apparatus of the invention will now be described, but such example is intended to only illustrate a selective embodiment of the invention and should in no way be considered as an exclusive teaching.

Whole fish containing about 50 to 60 percent of moisture are cut up into large chunks, the chunks are pretreated with steam for 5 seconds and thereafter ground in the prebreaker 12 to particle sizes of less than about 0.5 inch in diameter. The particles are further comminuted in the disintegrator, and then transferred to the cooker 18. The cooker is about one half full of heptane solvent. The heptane is replenished as desired from inlet line 31. The temperature within the cooker is maintained at azeotropic forming levels, or at least 79.5° C., by delivering hot heptane vapors having a temperature of at least 98.4° C. The divergent temperature between the hot heptane vapor and the azeotropic vapor is at least about 22° C. which is an advantageous difference for efficient heat transfer. One of the advantages of using heptane is that the divergent temperature is greater than that obtained with many other non-aqueous fat solvents, for example, the highly useful ethylene dichloride has a divergent temperature of 11.5° C. between its boiling point and the azeotropic forming level.

One of the difficulties in processing wet sticky tissue is that the tissue adheres to surfaces, particularly heating panels, and renders the equipment inoperative or inefficient and requires cleaning of the equipment. In accordance with the present invention, a principal heat source is solvent vapor which directly transfers heat to the slurry of that solvent and wet particles. When the wet particles are adequately dried, they will not adhere to surfaces, and can be processed in a normal manner.

Solvent vapors may be introduced into a slurry of that solvent and wet particles either through openings in the vessel containing the slurry or through a perforated surface. If the particles are heavier than the solvent employed, they will fall to the bottom of the vessel and tend to coagulate on the bottom surface. To avoid coagulation, means such as a screw conveyor, a drag, or rotating vanes must be provided. Such means must come in contact with the bottom of the vessel, and hence the wet particles adhering to the bottom tend to impede motion of the means utilized to move the particles along a path. In accordance with the present invention, retardation of motion caused by adhering particles is substantially reduced by utilizing a perforated screen directly beneath the mechanical means for moving the particles and impressing jets or streams of vapor through the screen, thereby releasing both by mechanical action and drying the adhered particles.

The invention may be practiced in the many ways which will occur to such practitioners, and such invention should be limited only by the terms of the following claims as given further meaning by the preceding description.

The invention claimed is:

1. An apparatus for separating fat and water from wet biological tissue, comprising a cooker vessel for containing a fluent slurry of wet biological tissue and a water immiscible fat solvent which forms with water from the tissue an azeotrope and which forms with fat from the tissue a fluent miscella, a perforate support for tissue disposed within said vessel and having a substantial horizontal extent therein in a medial location between the top and bottom thereof, means defining a tissue inlet into said vessel disposed above the adjacent portion of the perforate support, tissue supply means connected to supply tissue to said vessel through said inlet, means defining a tissue solids outlet from said vessel, said tissue inlet and said tissue solids outlet being spaced apart and positioned with reference to said perforate support so that tissue must pass over said support from said inlet to reach said outlet, tissue solids receiving means connected to remove tissue solids from said vessel through said outlet, a screw conveyor movably disposed in said vessel for movement over said perforate support in proximity thereto to transfer tissue from said tissue inlet toward said tissue solids outlet, power operating means connected to drive said screw conveyor, a solvent heater for containing and heating solvent to a hot vaporous state, vapor distributing means positioned below said perforate support and being connected with said solvent heater to receive hot solvent vapor therefrom, said vapor distributing means including an elongated plenum tube defining a plurality of distribution outlets opening into the interior of said vessel to continuously heat the slurry in said vessel to evaporate azeotrope therefrom and being positioned along said perforate support to distribute the hot solvent vapor along substantial areas of the support and to direct the solvent vapor against said perforate support to clean the support of tissue conglomeration so as not to unduly impede movement of said screw conveyor or passage of the miscella through the perforate support, means defining a miscella outlet disposed below said perforate support so that miscella passes through said support continuously cleaned by said solvent vapor to reach said miscella outlet from above said perforate support, miscella receiving means connected to continuously withdraw fluent miscella from said vessel through said miscella outlet, means defining an azeotrope outlet disposed above said perforate support, and azeotrope vapor conveying means connected with said vessel to withdraw azeotrope vapor from the vessel through said azeotrope outlet.

2. An apparatus for separating fat and water from wet biological tissue, comprising a cooker vessel for containing a fluent slurry of wet biological tissue and a water immiscible fat solvent which forms with water from the tissue an azeotrope and which forms with fat from the tissue a fluent miscella, a perforate support for tissue within said vessel and having a substantial horizontal extent therein in a medial location between the top and bottom thereof, means defining a tissue inlet into said vessel disposed above the adjacent portion of the perforate support, tissue supply means connected to supply tissue to said vessel through said inlet, means defining a tissue solids outlet from said vessel, said tissue inlet and said tissue solids outlet being spaced apart and positioned with reference to said perforate support so that tissue must pass over said support from said inlet to reach said outlet, tissue solids receiving means connected to remove tissue solids from said vessel through said outlet, a plurality of rotatable dividers disposed in said vessel for rotary movement over said perforate support in proximity thereto to advance tissue in an arcuate path over said perforate support from said tissue inlet toward said tissue solids outlet, power operating means connected to drive said rotatable dividers, said perforate support defining an opening positioned and adapted to discharge tissue solids to said tissue solids outlet when the space between two adjacent ones of said rotatable dividers is disposed in registry with said opening as an incident to rotation of said dividers, a solvent heater for containing and heating solvent to a hot vaporous state, vapor distributing means positioned below said perforate support and being connected with said solvent heater to receive hot solvent vapor therefrom, said vapor distributing means including a plenum tube rotatably disposed in said vessel in proximity to said perforate support and defining a plurality of distribution outlets opening into the interior of said vessel to continuously heat the slurry in said vessel to evaporate azeotrope therefrom and being oriented with reference to said perforate support to direct the solvent vapor against said perforate support to clean successive areas of the support of tissue conglomeration to permit the tissue solids to be advanced without undue obstruction and so as not to unduly impede movement of said rotatable dividers or passage of the miscella through the perforate support, means defining a miscella outlet disposed below said perforate support so that miscella passes through said support continuously cleaned by said solvent vapor to reach said miscella outlet from above said perforate support, miscella receiving means connected to continuously withdraw fluent miscella from said vessel through said miscella outlet, means defining an azeotrope outlet disposed above said perforate support, and azeotrope vapor conveying means connected with said vessel to withdraw azeotrope vapor from the vessel through said azeotrope outlet.

3. An apparatus according to claim 2 further characterized by motor means constituting said power operating means, a rotatable central shaft rotated by said motor means and rotating said dividers, said plenum tube being joined to said rotary shaft to rotate therewith at the same rotary speed as said dividers, said cooker vessel having a lower region thereof disposed below said perforate support, said lower region of the cooker vessel having a minor portion thereof disposed below said opening in said perforate support to receive tissue solids dropped through said opening from above said support, said tissue solids outlet communicating with said minor portion of the lower region of said cooker vessel to remove tissue solids therefrom, the lower region of said cooker vessel having a major portion thereof underlying said perforate support to receive miscella passing therethrough from above the support, and said miscella receiving portion being connected through said miscella outlet to said major portion of said lower region of the cooker vessel to continuously withdraw fluent miscella therefrom.

4. An apparatus for separating fat and water from wet biological tissue, comprising a cooker vessel for containing a fluent slurry of wet biological tissue and a water immiscible fat solvent which forms with water from the tissue an azeotrope and which forms with fat from the tissue a fluent miscella, a perforate support for tissue disposed within said vessel and having a substantial horizontal extent therein in a medial location between the top and bottom thereof, means defining a tissue inlet into said vessel disposed above the adjacent portion of the perforate support, tissue supply means connected to supply tissue to said vessel through said inlet, means defining a tissue solids outlet from said vessel, said tissue inlet and said tissue solids outlet being spaced apart and positioned with reference to said perforate support so that tissue must pass over said support from said inlet to reach said outlet, tissue solids receiving means connected to remove tissue solids from said vessel through said outlet, mechanical tissue transfer means movably disposed in said vessel for movement over said perforate support in proximity thereto to transfer tissue from said tissue inlet toward said tissue solids outlet, power operating means connected to drive said transfer means, solvent heating means for containing and heating solvent to a hot vaporous state, vapor distributing means connected with said solvent heating means to receive hot solvent vapor therefrom and defining a plurality of distribution outlets opening into the interior of said vessel along and below said perforate support to direct solvent vapor at said support to continuously clean the support and said transfer means and to continuously heat the slurry in said vessel to evaporate azeotrope therefrom, mean defining a miscella outlet disposed below said perforate support so that miscella passes through said support continuously cleaned by said solvent vapor to reach said miscella outlet from above said perforate support, miscella receiving means connected to continuously withdraw fluent miscella from said vessel through said miscella outlet, means defining an azeotrope outlet disposed above said perforate support, and azeotrope vapor receiving means connected with said vessel to withdraw azeotrope vapor from the vessel through said azeotrope outlet.

5. An apparatus according to claim 4 in which said vapor distributing means extends into said vessel in underlying relation to said perforate support and said outlets underlie the support to direct vaporized solvent against the support and through the support to said tissue transfer means to continuously clean the latter and said support, and further comprising a secondary cooker connected with said miscella receiving means to receive miscella therefrom for further heat processing of the miscella.

6. An apparatus according to claim 4 in which said mechanical tissue transfer means comprises an endless run-around conveyor element including a succession of spaced dividing means thereon and having a run extending over said perforate support to transfer tissue across said perforate support from said tissue inlet toward said tissue solids outlet.

References Cited

UNITED STATES PATENTS

| 768,575 | 8/1904 | Hand | 202—234 X |
|---|---|---|---|
| 773,139 | 10/1904 | Gesner | 202—234 X |
| 990,862 | 5/1911 | Hamlin | 202—234 X |
| 2,759,883 | 8/1956 | Thurman. | |
| 2,806,297 | 9/1957 | Hutchins | 34—173 |
| 3,084,107 | 4/1963 | McMahon | 159—16 X |
| 2,374,425 | 4/1945 | De Weerth | 99—246 |
| 2,374,587 | 4/1945 | De Weerth | 99—246 |
| 2,273,557 | 2/1942 | Bonotto | 202—169 |

NORMAN YUDKOFF, Primary Examiner

J. SOFER, Assistant Examiner

U.S. Cl. X.R.
159—25; 202—175